United States Patent
Okuyama et al.

(10) Patent No.: US 12,101,048 B2
(45) Date of Patent: Sep. 24, 2024

(54) MOTOR CONTROL METHOD AND MOTOR CONTROL DEVICE

(71) Applicants: NISSAN MOTOR CO., LTD., Yokohama (JP); RENAULT s.a.s., Boulogne-Billancourt (FR)

(72) Inventors: Yuka Okuyama, Kanagawa (JP); Abdelkader Bouarfa, Guyancourt (FR)

(73) Assignees: NISSAN MOTOR CO., LTD., Yokohama (JP); RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 18/576,915

(22) PCT Filed: Jul. 6, 2021

(86) PCT No.: PCT/IB2021/000455
§ 371 (c)(1),
(2) Date: Jan. 5, 2024

(87) PCT Pub. No.: WO2023/281285
PCT Pub. Date: Jan. 12, 2023

(65) Prior Publication Data
US 2024/0266982 A1 Aug. 8, 2024

(51) Int. Cl.
*H02P 27/08* (2006.01)
*H02P 6/32* (2016.01)
(Continued)

(52) U.S. Cl.
CPC .............. *H02P 27/085* (2013.01); *H02P 6/32* (2016.02); *H02P 21/18* (2016.02); *H02P 21/20* (2016.02); *H02P 2207/05* (2013.01)

(58) Field of Classification Search
CPC .......... H02P 27/085; H02P 6/32; H02P 21/18; H02P 21/20; H02P 2207/05
(Continued)

(56) References Cited

U.S. PATENT DOCUMENTS

| | | | | |
|---|---|---|---|---|
| 7,663,329 B2 * | 2/2010 | Muta | ................. | H02M 7/53875 318/432 |
| 2018/0278178 A1 | 9/2018 | Saha et al. | | |

(Continued)

FOREIGN PATENT DOCUMENTS

| | | |
|---|---|---|
| JP | H09-121595 A | 5/1997 |
| JP | 2007-110781 A | 4/2007 |

(Continued)

*Primary Examiner* — David Luo
(74) *Attorney, Agent, or Firm* — Foley & Lardner LLP

(57) ABSTRACT

A motor control method for controlling a motor by transmitting a PWM signal at a predetermined carrier frequency to a power converter configured to supply power to the motor and performing switching control on the power converter, the method including, in a characteristic coordinate having a rotation speed of the motor and a torque of the motor as axes, setting the carrier frequency to be a reference frequency when an operating point representing a current rotation speed and torque is included in a first region, selecting and setting the carrier frequency to be either the reference frequency or a low frequency lower than the reference frequency when the operating point is included in a second region, and setting the carrier frequency to be the low frequency when the operating point is included in a third region.

8 Claims, 3 Drawing Sheets

(51) Int. Cl.
*H02P 21/18* (2016.01)
*H02P 21/20* (2016.01)

(58) Field of Classification Search
USPC ........................................ 318/700, 560, 599
See application file for complete search history.

(56) References Cited

U.S. PATENT DOCUMENTS

| | | |
|---|---|---|
| 2019/0229661 A1 | 7/2019 | Ogawa et al. |
| 2019/0296665 A1 | 9/2019 | Matsubara et al. |
| 2020/0403548 A1 | 12/2020 | Hatakeyama et al. |

FOREIGN PATENT DOCUMENTS

| | | |
|---|---|---|
| JP | 2019-129575 A | 8/2019 |
| WO | WO-2019/016901 A1 | 1/2019 |

* cited by examiner

MOTOR CONTROL METHOD AND MOTOR CONTROL DEVICE

TECHNICAL FIELD

The present invention relates to a motor control method and a motor control device.

BACKGROUND ART

Regarding PWM control of a power converter that supplies power to a motor, in a thermally severe situation such as a motor lock, it is necessary to provide a temperature protection function to the power converter, but in order to obtain better efficiency, it is desirable to reduce a loss (the number of times of switching or the like) in a normal use range. On the other hand, there is control for switching a carrier frequency to a lower carrier frequency as temperature protection or efficiency improvement that does not require current reduction (torque limitation) (see JP H09-121595 A).

SUMMARY OF INVENTION

However, with this control, a voltage ripple and sound vibration deteriorate. It is difficult to generate a regular sine wave by PWM, and there is a problem that the carrier frequency cannot be switched to a low frequency side except when a rotation speed of a motor is low.

Therefore, an object of the present invention is to provide a motor control method and a motor control device that can perform temperature protection of a power converter while avoiding a decrease in efficiency of PWM control.

A motor control for controlling a motor according to one embodiment of the present invention is a motor control method for controlling a motor by transmitting a PWM signal at a predetermined carrier frequency to a power converter configured to supply power to the motor and performing switching control on the power converter, the method including, in a characteristic coordinate having a rotation speed of the motor and a torque of the motor as axes, the characteristic coordinate including a first region representing a region where the rotation speed is higher than a first predetermined rotation speed, a second region representing a region where the rotation speed is equal to or lower than the first predetermined rotation speed and the torque is higher than a predetermined torque, and a third region representing a region where the rotation speed is equal to or lower than the first predetermined rotation speed and the torque is equal to or lower than the predetermined torque, setting the carrier frequency to be a reference frequency when an operating point representing a current rotation speed and torque is included in the first region, selecting and setting the carrier frequency to be either the reference frequency or a low frequency lower than the reference frequency when the operating point is included in the second region, setting the carrier frequency to be the low frequency when the operating point is included in the third region, setting a modulation method of the PWM signal to be three-phase modulation when the operating point is included in a region other than a specific region disposed inside the third region, and setting the modulation method of the PWM signal to be two-phase modulation when the operating point is included in the specific region.

DESCRIPTION OF EMBODIMENTS

Outline of Present Embodiment

A motor control method and a motor control device 100 according to the present embodiment will be described.

Figure 1:
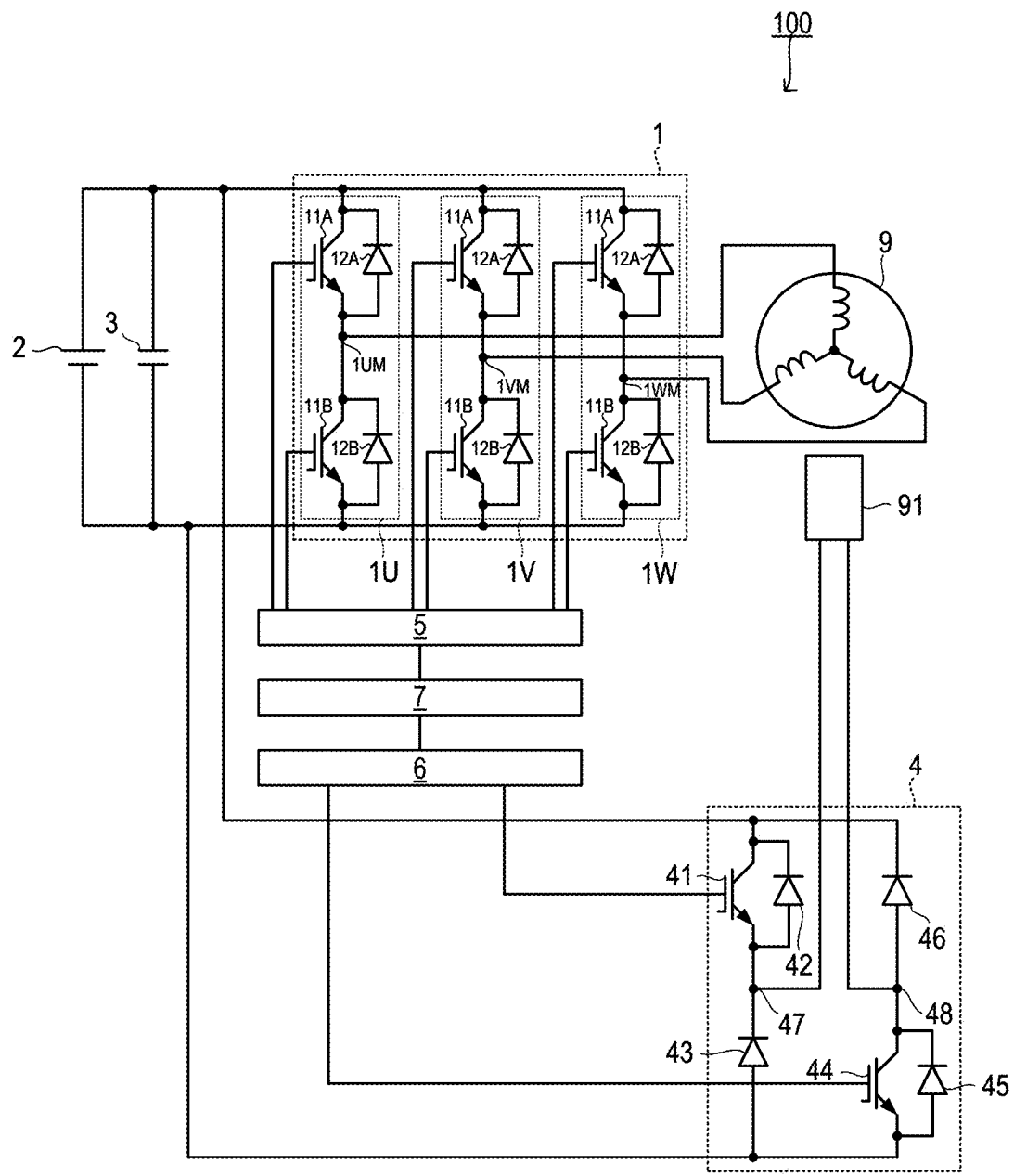
FIG. 1 is a schematic diagram of a motor control device to which a motor control method according to the present embodiment is applied.

FIG. 1 is a schematic diagram of the motor control device 100 to which the motor control method according to the present embodiment is applied. The motor control device 100 according to the present embodiment is mainly mounted on a vehicle and is connected to a motor 9.

The motor 9 is a wound field synchronous motor, and includes an exciter 91 that generates a magnetic field in a rotor. The exciter 91 includes a field winding and a configuration for reducing a field current flowing through the field winding, that is, a configuration for performing field weakening control.

The motor control device 100 includes an inverter 1 (power converter), a capacitor 2, a smoothing capacitor 3, a field circuit 4, a drive circuit 5, a drive circuit 6, and a control circuit 7. Although not shown, the motor control device 100 includes a rotation speed sensor that detects a rotation speed of the motor 9, a current sensor that detects a current flowing through the motor 9 (stator), and a temperature sensor that detects a temperature of the inverter 1 (semiconductor elements 11A and 11B).

The inverter 1 includes an internal circuit in which three series circuits (series circuit 1U, series circuit 1V, and series circuit 1W) are connected in parallel in which a parallel circuit of the semiconductor element 11A (high side) such as an insulated gate bipolar transistor (IGBT) and a feedback diode 12A, and a parallel circuit of the semiconductor element 11B (low side) and a feedback diode 12B are connected in series. Here, when a gate signal with a high-level (high voltage) is applied to gates of the semiconductor elements 11A and 11B, the semiconductor elements 11A and 11B become conductive (short-circuited), and when a gate signal with a low-level (low voltage having a voltage lower than the high voltage) is applied, the semiconductor elements 11A and 11B become non-conductive.

A connection midpoint 1UM of the series circuit 1U is connected to a U-phase coil of the stator of the motor 9, a connection midpoint 1VM of the series circuit 1V is connected to a V-phase coil of the stator of the motor 9, and a connection midpoint 1WM of the series circuit 1W is connected to a W-phase coil of the stator of the motor 9.

Here, when the series circuits 1U, 1V, and 1W receive a PWM control signal for driving from the drive circuit 5, the series circuits 1U, 1V, and 1W convert a direct current supplied from the capacitor 2 into a three-phase alternating current and output the three-phase alternating current to the motor 9. When the motor 9 generates a regenerative current, the inverter 1 receives a PWM control signal for extracting the regenerative current from the drive circuit 5 to receive the regenerative current, and converts the regenerative current into a single-layer direct current to charge the capacitor 2 or the smoothing capacitor 3.

The capacitor 2 supplies power to the motor 9 via the inverter 1 during driving of the vehicle. During braking of the vehicle, the regenerative current generated by the motor 9 is supplied to the capacitor 2 via the inverter 1.

The smoothing capacitor 3 charges the regenerative current (direct current) supplied from the inverter 1, thereby smoothing a direct current voltage (reducing a ripple voltage) and supplying the smoothed direct current voltage to the capacitor 2.

Similarly to the inverter 1, the field circuit 4 is a circuit in which a series circuit of a diode 43 (low voltage side) and a parallel circuit (high voltage side) of a semiconductor element 41 such as an IGBT and a feedback diode 42, and a series circuit of a diode 46 (high voltage side) and a parallel circuit (low voltage side) of a semiconductor element 44 and a feedback diode 45 are connected in parallel to the capacitor 2.

A connection midpoint 47 between the diode 43 (low voltage side) and the parallel circuit (high voltage side) of the semiconductor element 41 and the feedback diode 42 and a connection midpoint 48 between the diode 46 (high voltage side) and the parallel circuit (low voltage side) of the semiconductor element 44 and the feedback diode 45 are connected to the exciter 91. A gate of the semiconductor element 41 and a gate of the semiconductor element 44 are connected to the field circuit 4. The field circuit 4 generates a field current based on a field signal transmitted from the drive circuit 6, and outputs the field current to the exciter 91.

The drive circuit 5 generates a reference sine wave based on a torque command value (corresponding to an amplitude of the reference sine wave) and a rotation speed command value (corresponding to a period of the reference sine wave) input from the control circuit 7, inputs the reference sine wave and a triangular wave of a predetermined carrier frequency to a comparator to generate a PWM signal as a signal representing a magnitude relationship therebetween, and outputs the PWM signal to the inverter 1.

As described later (see FIG. 2), the drive circuit 5 switches a carrier frequency and a modulation method (three-phase modulation and two-phase modulation) of the PWM signal based on a torque value corresponding to a current value detected by the current sensor, a rotation speed detected by the rotation speed sensor, and a temperature detected by the temperature sensor.

The drive circuit 5 can switch the carrier frequency and the modulation method (three-phase modulation and two-phase modulation) of the PWM signal based on the torque command value, the rotation speed command value, and a temperature estimated value (corresponding to an integration amount of the torque command value).

The drive circuit 6 generates a field signal based on the torque command value and the rotation speed command value input from the control circuit 7 and outputs the field signal to the field circuit 4.

The control circuit 7 generates a torque command value and a rotation speed command value based on information such as an accelerator opening, and outputs the torque command value and the rotation speed command value to the drive circuit 5 and the drive circuit 6.

[Relationship Between Torque, Rotation Speed, and Switching Frequency]

Figure 2:
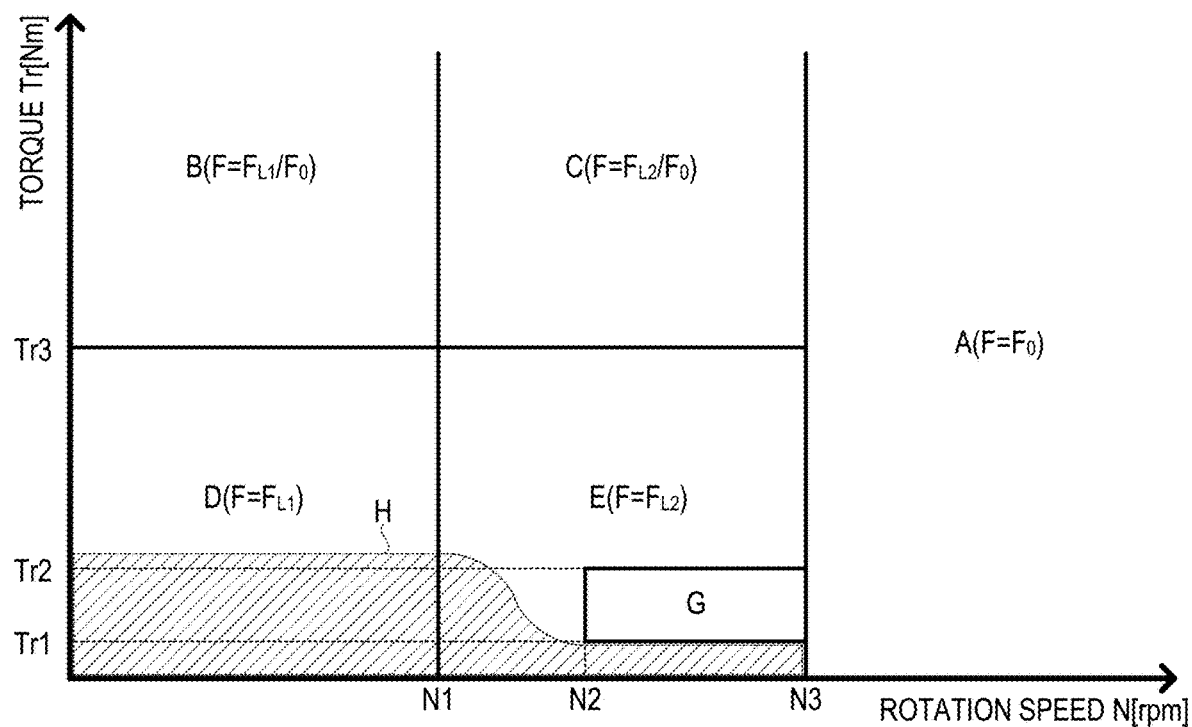
FIG. 2 is a diagram showing a carrier frequency and a modulation method of PWM control set in the motor control method according to the present embodiment, using a characteristic coordinate having a rotation speed of a motor and a torque of the motor as axes.

FIG. 2 is a diagram showing a carrier frequency and a modulation method of PWM control set in the motor control method according to the present embodiment, using a characteristic coordinate having a rotation speed of the motor 9 and a torque of the motor 9 as axes.

First, in the characteristic coordinate shown in FIG. 2, a characteristic region (A) where a rotation speed N is higher than N3 (high rotation speed) (first predetermined rotation speed), a characteristic region (B) where a torque Tr is higher than Tr3 (high torque (predetermined torque)) and the rotation speed N is equal to or lower than N1 (low rotation speed), a characteristic region (C) where the torque Tr is higher than Tr3 (high torque) and the rotation speed N is higher than N1 (low rotation speed), a characteristic region (D) where the torque Tr is equal to or lower than Tr3 (high torque) and the rotation speed N is equal to or lower than N1 (low rotation speed) (second predetermined rotation speed), and a characteristic region (E) where the torque Tr is equal to or lower than Tr3 (high torque) and the rotation speed N is higher than N1 (low rotation speed) and equal to or lower than N3 (high rotation speed) are set.

In the characteristic region (A), the drive circuit 5 sets a carrier frequency F of a PWM signal (triangular wave) to be $F_0$ (high frequency (fundamental frequency)).

In the characteristic region (B), the drive circuit 5 sets the carrier frequency F to be $F_0$ or a frequency lower than $F_0$, that is, $F_L=F_{L1}$ (low frequency).

In the characteristic region (C), the drive circuit 5 sets the carrier frequency F to be $F_0$ or $F_L=F_{L2}$ (medium frequency).

In the characteristic region (D), the drive circuit 5 sets the carrier frequency F to be $F_L=F_{L1}$ (low frequency).

In the characteristic region (E), the drive circuit 5 sets the carrier frequency F to be $F_L=F_{L2}$ (medium frequency). Here, the frequencies $F_0$, $F_{L1}$, and $F_{L2}$ have a relationship of $0<F_{L1}<F_{L2}<F_0$.

Inside the characteristic region (E), a characteristic region (G) (specific region) where the rotation speed N is higher than N2 (medium rotation speed) and the torque Tr is in a range of Tr1 (low torque)<Tr≤Tr2 (medium torque) is set. The carrier frequency F in the characteristic region (G) is set to be $F_{L2}$ (medium frequency) as in the characteristic region (E).

The rotation speeds N1, N2, and N3 have a relationship of 0<N1<N2<N3. Similarly, the torques Tr1, Tr2, and Tr3 have a relationship of 0<Tr1<Tr2<Tr3.

In the characteristic region (A), the characteristic region (B), the characteristic region (C), the characteristic region (D), and the characteristic region (E) (region other than the characteristic region (G)), the modulation method of the PWM control is set to be three-phase modulation.

In the characteristic region (G), the modulation method of the PWM control is set to be two-phase modulation.

In the PWM control, the carrier frequency F is set to be the high frequency ($F_0$), which is a high frequency, so as to improve controllability (responsiveness), reduce a voltage ripple, and improve NVH (sound vibration). In the present embodiment, the carrier frequency F is set to be the high frequency ($F_0$) in the characteristic region (A) which is a high rotation speed range (N>N3), and the carrier frequency F is selectively set to be the high frequency ($F_0$) in the characteristic region (B) and the characteristic region (C) which are high torque ranges (Tr>Tr3).

On the other hand, in the characteristic region (D), which is a low rotation speed range and a low torque range where influences of the voltage ripple and NVH are small, the low frequency ($F_L=F_{L1}$) is applied as the carrier frequency F, so that a switching loss of the inverter 1 and an EMC noise can be reduced.

In the present embodiment, a medium rotation speed range (N1<N≤N3) is set between the low rotation speed range and the high rotation speed range, and the characteristic region (C) which is the medium rotation speed range on a high torque side and the characteristic region (E) which is the medium rotation speed range on a low torque side are set.

In the characteristic region (E), the medium frequency ($F_L=F_{L2}$) is applied as the carrier frequency F, so that the switching loss of the inverter 1 can be reduced compared to a case where the high frequency ($F_0$) is applied. When the low frequency ($F_L=F_{L1}$) is applied as the carrier frequency F in the characteristic region (E), distortion of an output voltage (sine wave) of the inverter 1 becomes large, which is not preferable.

In the present embodiment, in the characteristic region (G) inside the characteristic region (E), the two-phase modulation is set as the modulation method of the PWM control. The two-phase modulation is a method in which any one phase is normally fixed at high or low and remaining two phases are normally modulated in the entire section in a periodic direction. In the two-phase modulation, switching control of any one phase is always stopped, and thus the switching loss in the inverter 1 can be reduced to ⅔. However, in a case of the two-phase modulation, the voltage ripple is likely to occur when a torque increases, and thus the two-phase modulation is applied in a range satisfying Tr1 (low torque)<Tr≤Tr2 (medium torque) as described above.

In the characteristic region (C) which is a medium frequency range and the high torque range, the high frequency ($F_0$) is applied as the carrier frequency F, but the low frequency ($F_L=F_{L2}$) may also be applied. Accordingly, the switching loss of the inverter 1 can be reduced, and a temperature of the inverter 1 (semiconductor elements 11A and 11B) can be decreased, and a performance of the inverter 1 can be maintained by switching the carrier frequency F as temperature protection for the inverter 1, without applying torque limitation as described later.

In the characteristic region (B) which is a low frequency range and the high torque range, the high frequency ($F_0$) is applied as the carrier frequency F, but the medium frequency ($F_L=F_{L1}$) may also be applied. Accordingly, the switching loss of the inverter 1 can be reduced, and the temperature of the inverter 1 (semiconductor elements 11A and 11B) can be decreased, and the performance of the inverter 1 can be maintained by switching the carrier frequency F as the temperature protection for the inverter 1, without applying the torque limitation as described later.

In the characteristic region (A), a modulation rate of the PWM control is increased and a loss is reduced, and thus it is not necessary to perform control to switch the carrier frequency F to the low frequency ($F_L=F_{L1}$) or the medium frequency ($F_L=F_{L2}$).

In the present embodiment, in the low torque range, a carrier frequency is set in each of the high rotation speed range (N>N3), the medium rotation speed range (N1<N≤N3), and the low rotation speed range (N≤N1), but the carrier frequency may be set to increase as the rotation speed increases.

[Control Flow]

Figure 3:
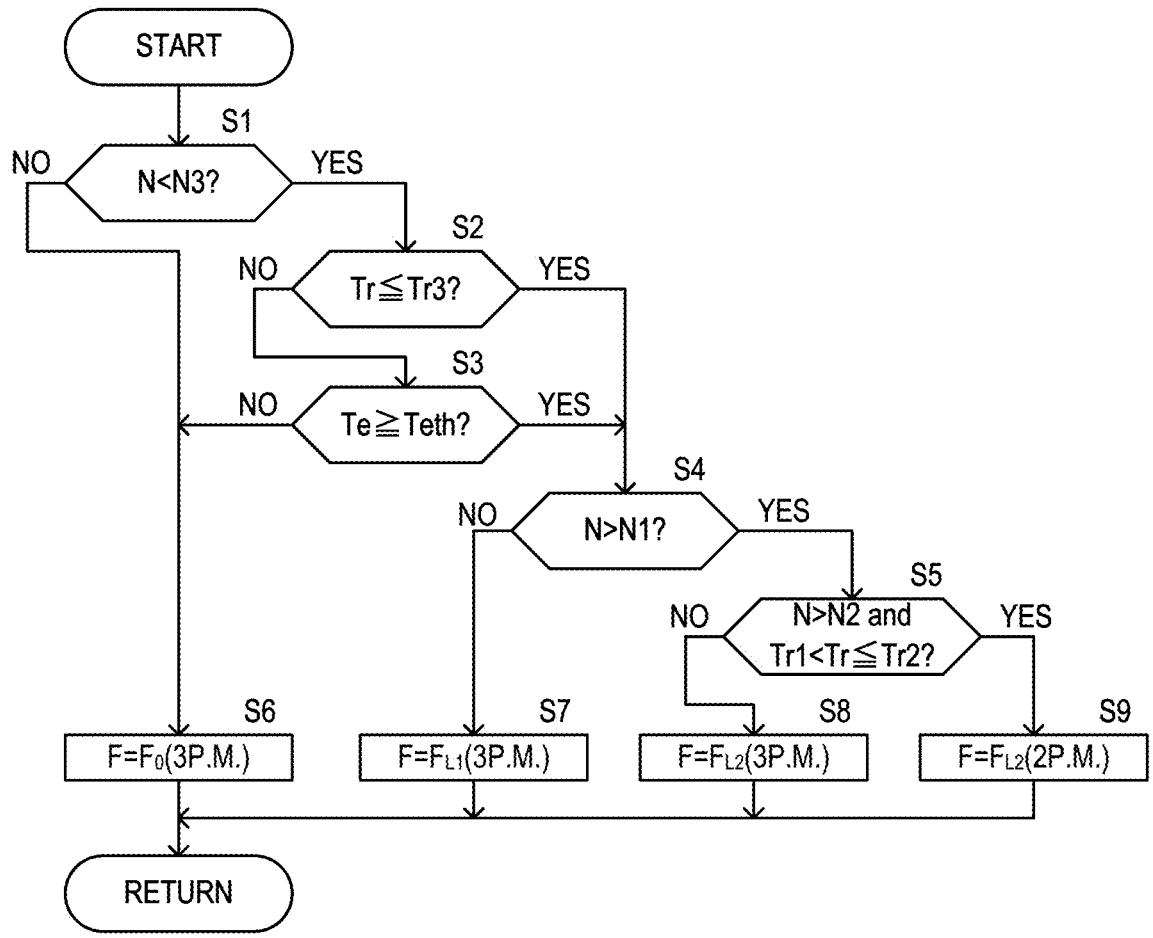
FIG. 3 is a flowchart of the motor control method according to the present embodiment.

FIG. 3 is a flowchart of the motor control method according to the present embodiment.

In step S1, the drive circuit 5 determines whether the rotation speed N (actual measurement value or command value, the same applies hereinafter) of the motor 9 is lower than N3 (high rotation speed), and if YES, the process moves to step S2, and if NO, the process moves to step S6.

In step S2, the drive circuit 5 determines whether the torque Tr (actual measurement value or command value, the same applies hereinafter) of the motor 9 is equal to or lower than Tr3 (high torque), and if YES, the process moves to step S4, and if NO, the process moves to step S3.

In step S3, the drive circuit 5 determines whether a temperature Te (actual measurement value or estimated value, the same applies hereinafter) of the inverter 1 is equal to or higher than a predetermined threshold temperature Teth (threshold corresponding to an actual measurement value or threshold corresponding to an estimated value), and if YES, the process moves to step S4, and if NO, the process moves to step S6.

Here, an estimated value is usually used as the temperature Te of the inverter 1, and a value for the estimated value is also applied as the threshold temperature Teth. The estimated value is estimated based on, for example, the rotation speed of the motor 9 and an accumulated (integration) amount of a torque. On the other hand, for example, when there is an abnormality in a cooling system of the motor 9 or the like, an actual measurement value (temperature detected by the temperature sensor) is used as the temperature Te of the inverter 1, and a value corresponding to the actual measurement value is also applied as the threshold temperature Teth.

The temperature protection for the inverter 1 includes control of switching the carrier frequency from the high frequency to the low frequency or the medium frequency as described above, and control of performing the torque limitation (setting an upper limit to a drive torque and a regenerative braking torque). However, the threshold temperature Teth of the inverter 1 for switching the carrier frequency from the high frequency to the low frequency or the medium frequency is set to be lower than a temperature threshold of the inverter 1 for performing the torque limitation by a predetermined temperature.

Therefore, actually, when the temperature of the inverter 1 exceeds the threshold temperature Teth, the control of switching the carrier frequency from the high frequency to the low frequency or the medium frequency is performed to achieve the temperature protection, but when the temperature further increases for some reason and the temperature Te of the inverter 1 exceeds the temperature threshold for performing the torque limitation, the torque limitation is performed.

In step S4, the drive circuit 5 determines whether the rotation speed N of the motor 9 is higher than N1 (low rotation speed), and if YES, the process moves to step S5, and if NO, the process moves to step S7.

In step S5, the drive circuit 5 determines whether the rotation speed N of the motor 9 is higher than N2 (medium rotation speed) and the torque Tr of the motor 9 satisfies a relationship of Tr1 (low torque)<Tr≤ Tr2 (medium torque), and if YES, the process moves to step S9, and if NO, the process moves to step S8.

In step S6, the drive circuit 5 determines that an operating point (rotation speed, torque) is in the characteristic region (A), the operating point (rotation speed, torque) is in the characteristic region (B) and the temperature Te of the inverter 1 is lower than the threshold temperature Teth, or the operating point (rotation speed, torque) is in the characteristic region (C) and the temperature Te of the inverter 1 is lower than the threshold temperature Teth, sets the carrier frequency F to be $F_0$ (high frequency), and sets the modulation method of the PWM control to be the three-phase modulation (3 P.M.).

In step S7, the drive circuit 5 determines that the operating point (rotation speed, torque) is in the characteristic region (D), or the operating point (rotation speed, torque) is in the characteristic region (B) and the temperature Te of the inverter 1 is equal to or higher than the threshold temperature Teth, sets the carrier frequency F to be $F_{L1}$ (low frequency), and sets the modulation method of the PWM control to be the three-phase modulation (3 P.M.).

In step S8, the drive circuit 5 determines that the operating point (rotation speed, torque) is in the characteristic region (E), or the operating point (rotation speed, torque) is in the characteristic region (C) and the temperature Te of the inverter 1 is equal to or higher than the threshold temperature Teth, sets the carrier frequency F to be $F_{L2}$ (medium frequency), and sets the modulation method of the PWM control to be the three-phase modulation (3 P.M.).

In step S9, the drive circuit 5 determines that the operating point (rotation speed, torque) is in the characteristic region (G), sets the carrier frequency F to be $F_{L2}$ (medium frequency), and sets the modulation method of the PWM control to be the two-phase modulation (2 P.M.). The drive circuit 5 repeatedly executes the above flow during operation of the motor 9.

As shown in FIG. 2, when the carrier frequency F is set based on each region, there is a case where the operating point (rotation speed, torque) frequently moves back and forth between adjacent regions. In this case, control (chattering) in which the carrier frequency F is frequently switched is performed, which may place a burden on the control. Therefore, in the present embodiment, regarding the control of switching the carrier frequency, a hysteresis width is set for the torque and the rotation speed which are determination references of the control (for each physical quantity, a first threshold when a value decreases and a second threshold when the value increases are set, and the second threshold is set to be a value higher than the first threshold), thereby preventing the chattering.

In the present embodiment, as described above, the motor 9 is the wound field synchronous motor, and when a field current is applied to the exciter 91, a back electromotive force (electromotive force (induced voltage) in a direction of disturbing the field current) is generated in the motor 9. This back electromotive force is remarkable in cases of a high rotation speed and a high torque.

As shown in FIG. 2, the characteristic region (A) includes a region where the rotation speed is high and the back electromotive force is high. In this region, the operating point (rotation speed, torque) cannot be set by normal control, and the field current cannot flow. Therefore, control for weakening the field current (field weakening control) is performed, and the operating point (rotation speed, torque) of the motor 9 is moved to a region where the back electromotive force is weakened, thereby expanding an output range of the motor 9. In the characteristic region (A), an output voltage and an output current of the three-phase modulation and an output voltage and an output current of the two-phase modulation have similar characteristics.

The characteristic region (B) and the characteristic region (D) (excluding a characteristic region (H) to be described later) are regions where the back electromotive force is small and the field weakening control is not performed. In these regions, for example, a quality of the output voltage and the output current is good (for example, the voltage ripple is small, or within an allowable range), and in particular, the quality is better in the three-phase modulation than in the two-phase modulation.

The characteristic region (E) (excluding the characteristic region (H) to be described later) is a region where a certain amount of back electromotive force is generated, but the operating point (rotation speed, torque) can be set without performing the field weakening control.

The characteristic region (G) is biased to a position on a high rotation speed side and low torque side in the characteristic region (E), where a torque value is equal to or greater than zero.

In the characteristic region (G), the two-phase modulation provides higher efficiency (smaller loss and voltage ripple within the allowable range) than the three-phase modulation, and thus the two-phase modulation is applied. The characteristic region (E) does not overlap the characteristic region (H) to be described later.

The characteristic region (H) is distributed over the characteristic region (D) and the characteristic region (E). The characteristic region (H) is distributed on a low torque side of the characteristic region (D) and on the low torque side of the characteristic region (E).

In the characteristic region (D), a boundary of the characteristic region (H) is substantially parallel to a horizontal axis. In the characteristic region (E), a boundary of the characteristic region (H) monotonically decreases as a rotation speed increases, and for example, when the rotation speed N is between N2 and N3, the boundary is substantially parallel to the horizontal axis. The characteristic region (H) is a region where ripples with respect to fundamental waves of the output current and the output voltage tend to increase. Therefore, in the characteristic region (H), NVH, EMC, and the like are affected, and thus the two-phase modulation is not applied.

Effects of Present Embodiment

The motor control method according to the present embodiment is a motor control method for controlling the motor 9 by transmitting a PWM signal at a predetermined carrier frequency to a power converter (inverter 1) configured to supply power to the motor 9 and performing switching control on the power converter (inverter 1), the method including: in a characteristic coordinate having a rotation speed (N) of the motor 9 and a torque (Tr) of the motor 9 as axes, the characteristic coordinate including a first region representing a region where the rotation speed (N) is higher than a first predetermined rotation speed (N3), a second region representing a region where the rotation speed (N) is equal to or lower than the first predetermined rotation speed (N3) and the torque (Tr) is higher than a predetermined torque (Tr3), and a third region representing a region where the rotation speed (N) is equal to or lower than the first predetermined rotation speed (N3) and the torque (Tr) is equal to or lower than the predetermined torque (Tr3), setting the carrier frequency (F) to be a reference frequency ($F_O$) when an operating point (rotation speed, torque) representing a current rotation speed (N) and torque (Tr) is included in the first region (characteristic region (A)); selecting and setting the carrier frequency (F) to be either the reference frequency ($F_O$) or a low frequency ($F_L$) lower than the reference frequency ($F_O$) when the operating point (rotation speed, torque) is included in the second region (characteristic region (B), characteristic region (C)); setting the carrier frequency (F) to be the low frequency ($F_L$) when the operating point (rotation speed, torque) is included in the third region (characteristic region (D), characteristic region (E)); setting a modulation method of the PWM signal to be three-phase modulation when the operating point (rotation speed, torque) is included in a region other than a specific region (characteristic region (G)) disposed inside the third region (characteristic region (E)); and setting the modulation method of the PWM signal to be two-phase modulation when the operating point (rotation speed, torque) is included in the specific region (characteristic region (G)).

According to the above method, an appropriate carrier frequency is set in accordance with the rotation speed and the torque of the motor 9, and two-phase modulation PWM control is applied in a region where the two-phase modulation PWM control is more advantageous than three-phase modulation PWM control (for example, a region where a switching loss is small and a voltage ripple is reduced to be low), so that efficient switching control can be realized corresponding to any position of the characteristic coordinate represented by (rotation speed, torque).

In the present embodiment, the method further includes: when the operating point (rotation speed, torque) is included in the third region (characteristic region (D), characteristic region (E)), selecting the low frequency ($F_L$) from a plurality of the carrier frequencies (F) that differ from each other based on the rotation speed (N), and setting the carrier frequency (F) to be the low frequency ($F_L$) that is lower as the rotation speed (N) decreases.

According to the above method, the low frequency ($F_L$) optimized corresponding to the rotation speed (N) is selected, so that the efficiency of the switching control can be further improved.

The third region (characteristic region (D), characteristic region (E)) includes a fourth region (characteristic region (D)) where the rotation speed (N) is equal to or lower than a second predetermined rotation speed (N1) lower than the first predetermined rotation speed (N3) and a fifth region (characteristic region (E)) where the rotation speed (N) is higher than the second predetermined rotation speed (N1), and the method further includes: setting the low frequency ($F_L=F_{L1}$) that is set when the operating point (rotation speed, torque) is included in the fourth region (characteristic region (D)) to be lower than the low frequency (medium frequency) ($F_L=F_{L2}$) that is set when the operating point (rotation speed, torque) is included in the fifth region (characteristic region (E)).

According to the above method, the low frequency ($F_L=F_{L1}$ (low frequency), $F_{L2}$ (medium frequency)) optimized corresponding to the rotation speed (N) is selected, so that the efficiency of the switching control can be further improved.

In the present embodiment, the motor 9 is a wound field synchronous motor, and the specific region (characteristic region (G)) is biased to a position on a high rotation speed side and low torque side in the fifth region (characteristic region (E)), where a torque value is greater than zero.

According to the above method, the two-phase modulation is set in the specific region (characteristic region (G)) where the two-phase modulation provides higher efficiency (smaller loss and voltage ripple within an allowable range) than the three-phase modulation, and thus an output voltage and an output current can be output with higher efficiency.

In the present embodiment, the method further includes: when the operating point (rotation speed, torque) is included in the second region (characteristic region (B), characteristic region (C)), setting the carrier frequency (F) to be the reference frequency ($F_0$) when a temperature (Te) of the power converter (inverter 1) is equal to or lower than a predetermined threshold temperature (Teth); and setting the carrier frequency (F) to be the low frequency ($F_L$) that is in the third region (characteristic region (D), characteristic region (E)) and corresponds to the rotation speed (N) when the temperature (Te) of the power converter (inverter 1) exceeds the predetermined threshold temperature (Teth).

Temperature protection for the power converter (inverter 1) includes control of performing torque limitation, but the performing of the torque limitation may make a driver uncomfortable. However, according to the above method, the temperature protection for the power converter (inverter 1) can be performed without performing the torque limitation (before performing the torque limitation), and the driver does not feel uncomfortable.

In the present embodiment, the temperature of the power converter is estimated based on the rotation speed and the torque.

According to the above method, the temperature of the power converter (inverter 1) can be estimated more quickly than detecting an actual temperature of the power converter (inverter 1).

In the present embodiment, the operating point (rotation speed, torque) is set based on a rotation speed command value of the motor 9 and a torque command value of the motor 9. Accordingly, the operating point (rotation speed, torque) can be quickly specified, and the control can be quickly performed.

The motor control device 100 according to the present embodiment is the motor control device 100 for controlling the motor 9 by transmitting a PWM signal at a predetermined carrier frequency to a power converter (inverter 1) configured to supply power to the motor 9 and performing switching control on the power converter (inverter 1), in which in a characteristic coordinate having a rotation speed (N) of the motor 9 and a torque (Tr) of the motor 9 as axes, the characteristic coordinate including a first region representing a region where the rotation speed (N) is higher than a first predetermined rotation speed (N3), a second region representing a region where the rotation speed (N) is equal to or lower than the first predetermined rotation speed (N3) and the torque (Tr) is higher than a predetermined torque (Tr3), and a third region representing a region where the rotation speed (N) is equal to or lower than the first predetermined rotation speed (N3) and the torque (Tr) is equal to or lower than the predetermined torque (Tr3), the carrier frequency (F) is set to be a reference frequency ($F_0$) when an operating point (rotation speed, torque) representing a current rotation speed (N) and torque (Tr) is included in the first region (characteristic region (A)), the carrier frequency (F) is selected and set to be either the reference frequency ($F_0$) or a low frequency ($F_L$) lower than the reference frequency ($F_0$) when the operating point (rotation speed, torque) is included in the second region (characteristic region (B), characteristic region (C)), the carrier frequency (F) is set to be the low frequency ($F_L$) when the operating point (rotation speed, torque) is included in the third region (characteristic region (D), characteristic region (E)), a modulation method of the PWM signal is set to be three-phase modulation when the operating point (rotation speed, torque) is included in a region other than a specific region (characteristic region (G)) disposed inside the third region (characteristic region (E)), and the modulation method of the PWM signal is set to be two-phase modulation when the operating point (rotation speed, torque) is included in the specific region (characteristic region (G)).

According to the above configuration, an appropriate carrier frequency is set in accordance with the rotation speed and the torque of the motor 9, and two-phase modulation PWM control is applied in a region where the two-phase modulation PWM control is more advantageous than three-phase modulation PWM control (for example, a region where a switching loss is small and a voltage ripple is reduced to be low), so that efficient switching control can be realized corresponding to any position of the characteristic coordinate represented by (rotation speed, torque).

Although the embodiment of the present invention has been described above, the above embodiment is merely a part of application examples of the present invention, and is not intended to limit the technical scope of the present invention to the specific configurations of the above embodiment. The above embodiment can be combined as appropriate.

The invention claimed is:

1. A motor control method for controlling a motor by transmitting a PWM signal at a predetermined carrier frequency to a power converter configured to supply power to the motor and performing switching control on the power converter, the method comprising:
in a characteristic coordinate having a rotation speed of the motor and a torque of the motor as axes, the characteristic coordinate including a first region representing a region where the rotation speed is higher than a first predetermined rotation speed, a second region representing a region where the rotation speed is equal to or lower than the first predetermined rotation speed and the torque is higher than a predetermined torque, and a third region representing a region where the rotation speed is equal to or lower than the first predetermined rotation speed and the torque is equal to or lower than the predetermined torque,
setting the carrier frequency to be a reference frequency when an operating point representing a current rotation speed and torque is included in the first region;
selecting and setting the carrier frequency to be either the reference frequency or a low frequency lower than the reference frequency when the operating point is included in the second region;
setting the carrier frequency to be the low frequency when the operating point is included in the third region;
setting a modulation method of the PWM signal to be three-phase modulation when the operating point is included in a region other than a specific region disposed inside the third region; and
setting the modulation method of the PWM signal to be two-phase modulation when the operating point is included in the specific region.

2. The motor control method according to claim 1, further comprising:
when the operating point is included in the third region, selecting the low frequency from a plurality of the carrier frequencies that differ from each other based on the rotation speed, and setting the carrier frequency to be the low frequency that is lower as the rotation speed decreases.

3. The motor control method according to claim 2, further comprising:
when the operating point is included in the second region, setting the carrier frequency to be the reference frequency when a temperature of the power converter is equal to or lower than a predetermined threshold temperature; and
setting the carrier frequency to be the low frequency that is in the third region and corresponds to the rotation speed when the temperature of the power converter exceeds the predetermined threshold temperature.

4. The motor control method according to claim 3, wherein
the temperature of the power converter is estimated based on the rotation speed and the torque.

5. The motor control method according to claim 1, wherein
the third region includes a fourth region where the rotation speed is equal to or lower than a second predetermined rotation speed lower than the first predetermined rotation speed and a fifth region where the rotation speed is higher than the second predetermined rotation speed, and
the method further comprises: setting the low frequency that is set when the operating point is included in the fourth region to be lower than the low frequency that is set when the operating point is included in the fifth region.

6. The motor control method according to claim 5, wherein
the motor is a wound field synchronous motor, and
the specific region is biased to a position on a high rotation speed side and low torque side in the fifth region, where a torque value is greater than zero.

7. The motor control method according to claim 1, wherein
the operating point is set based on a rotation speed command value of the motor and a torque command value of the motor.

8. A motor control device for controlling a motor by transmitting a PWM signal at a predetermined carrier frequency to a power converter configured to supply power to the motor and performing switching control on the power converter, wherein
in a characteristic coordinate having a rotation speed of the motor and a torque of the motor as axes, the characteristic coordinate including a first region representing a region where the rotation speed is higher than a predetermined rotation speed, a second region representing a region where the rotation speed is equal to or lower than the predetermined rotation speed and the torque is higher than a predetermined torque, and a third region representing a region where the rotation speed is equal to or lower than the predetermined rotation speed and the torque is equal to or lower than the predetermined torque,
the carrier frequency is set to be a reference frequency when an operating point representing a current rotation speed and torque of the motor is included in the first region,
the carrier frequency is selected and set to be either the reference frequency or a low frequency lower than the reference frequency when the operating point is included in the second region,
the carrier frequency is set to be the low frequency when the operating point is included in the third region,
a modulation method of the PWM signal is set to be three-phase modulation when the operating point is included in a region other than a specific region disposed inside the third region, and
the modulation method of the PWM signal is set to be two-phase modulation when the operating point is included in the specific region.

* * * * *